US005596467A

United States Patent [19]

Yamamoto

[11] Patent Number: 5,596,467

[45] Date of Patent: Jan. 21, 1997

[54] ELECTRICAL ENERGY-TRANSFORMING EQUIPMENT

[76] Inventor: Makoto Yamamoto, 2525-1, Nishiharuchika, Ina, Nagano, Japan

[21] Appl. No.: 223,092

[22] Filed: Apr. 4, 1994

[30] Foreign Application Priority Data

Apr. 5, 1993 [JP] Japan .................................... 5-103621

[51] Int. Cl.$^6$ ...................................................... H02H 7/04

[52] U.S. Cl. ............................ 361/38; 361/603; 361/836

[58] Field of Search ............................... 361/35, 38, 603, 361/622, 634, 836; 336/96

[56] References Cited

U.S. PATENT DOCUMENTS 3,755,714 8/1973 Link ........................................ 361/67

*Primary Examiner*—Jeffrey A. Gaffin
*Assistant Examiner*—Sally O. Medley
*Attorney, Agent, or Firm*—Koda and Androlia

[57] ABSTRACT

An electrical energy-transforming equipment comprises a transformer arranged within a cubicle, a current transformer and a potential transformer both connected to the transformer. The transformer, the current transformer and the potential transformer are molded in one piece. In another form of the electrical energy-transforming equipment, a transformer for distributing electric power, which is molded with an insulating material, such as a synthetic resin or a synthetic rubber, is molded in one piece with a current transformer and a potential transformer both connected thereto, with an insulating material, such as a synthetic resin or a synthetic rubber. The electrical energy-transforming equipment may further comprise a breaker also molded in one piece with the rest thereof, with the insulating material. In the other form, a transformer which is molded with an insulating material, such as a synthetic resin or a synthetic rubber, is removably coupled with a current transformer and a potential transformer each molded with an insulating material, such that the current transformer and the potential transformer are electrically connected to the transformer inside the insulating material.

1 Claim, 4 Drawing Sheets

ELECTRICAL ENERGY-TRANSFORMING EQUIPMENT

BACKGROUND OF THE INVENTION

1. Field of the Invention

This invention relates to an electrical energy-transforming equipment, and more particularly to an electrical energy-transforming equipment for arrangement within a cubicle, which comprises a transformer for distributing electric power, a current transformer (CT), and a potential transformer (PT), all molded in one piece, thereby preventing an accident of electric shock from occurring, as well as making it possible to prevent the current transformer and the potential transformer from being deteriorated.

Prior Art

Within cubicles provided in a substation or the like, there are arranged, around a transformer located in the center for distributing electric power, a current transformer for measuring an electric current, a potential transformer for measuring a voltage, a breaker, and the like, in a required configuration, and these devices are connected to each other via cables. As the transformer, a dry-type molded transformer is known, which is molded with a synthetic resin or the like for prevention of deterioration and for protection of insulation.

Conventionally, devices of the electrical energy-transforming equipment, such as the transformer, the current transformer, and the potential transformer, are constructed in respective separate forms, and installed within each cubicle, so that connecting portions of the devices, and cables per se are exposed. When a worker enters such a cubicle for cleaning or maintenance of the devices forming the electrical energy-transforming equipment, he can touch, by accident, any of the exposed portions having a high voltage to receive an electric shock, which makes the cleaning or maintenance work very dangerous. Further, the separate arrangement of the devices is disadvantageous in that the work within the cubicle is troublesome, and that the interior space of the cubicle cannot be used efficiently enough, resulting in an increase in the size of the equipment.

Further, an insect, a rat, or the like can occasionally enter the cubicle. In such an event, the insect, the rat or the like can touch an exposed portion having a high voltage to receive an electric shock and lie dead, thereby deteriorating or causing damage to the current transformer or the potential transformer. In short, the inside of the conventional cubicle is not provided with a measure effective enough to prevent a possible accident of electric shock received by a worker, or by a rat or the like. Therefore, the number of accidents of electric shock received by workers amounts to several hundreds per year, and a proposal for solving this problem has long been awaited.

SUMMARY OF THE INVENTION

It is an object of the invention to provide an electrical energy-transforming equipment which is capable of preventing an accident of electric shock from occurring within a cubicle, as well as of achieving reduction of the size of the electrical energy-transforming equipment.

To attain the above object, according to a first aspect of the invention, there is provided an electrical energy-transforming equipment for arrangement within a cubicle, comprising: a transformer for distributing electric power; a current transformer connected to the transformer; and a potential transformer connected to the transformer, wherein the transformer, the current transformer, and the potential transformer are molded in one piece.

To attain the above object, according to a second aspect of the invention, there is provided an electrical energy-transforming equipment comprising: a transformer molded with a molding material, such as a synthetic resin or a synthetic rubber, for distributing electric power; a current transformer connected to the transformer; and a potential transformer connected to the transformer, wherein the transformer, the current transformer, and the potential transformer are molded in one piece with an insulating material, such as a synthetic resin or a synthetic rubber.

To attain the above object, according to a third aspect of the invention, there is provided an electrical energy-transforming equipment comprising: a transformer molded with an insulating material, such as a synthetic resin or a synthetic rubber, for distributing electric power; a current transformer molded with an insulating material and removably coupled with the transformer; and a potential transformer molded with the insulating material and removably coupled with the transformer, wherein the current transformer and the potential transformer are electrically connected inside the insulating material to the transformer.

To attain the above object, according to a fourth aspect of the invention, there is provided an electrical energy-transforming equipment comprising: a transformer molded with a molding material, such as synthetic resin or a synthetic rubber, for distributing electric power; a current transformer connected to the transformer; a potential transformer connected to the transformer; and a breaker connected to the current transformer and the potential transformer, wherein the transformer, the current transformer, the potential transformer, and the breaker are molded in one piece with an insulating material, such as a synthetic resin or a synthetic rubber.

BRIEF DESCRIPTION OF THE DRAWINGS

The above and other objects, features, and advantages of the invention will become more apparent from the following detailed description taken in conjunction with the accompanying drawings, in which.

DETAILED DESCRIPTION OF PREFERRED EMBODIMENT

Next, the invention will be described in detail with reference to drawings showing preferred embodiments thereof.

First Embodiment

Figure 1:
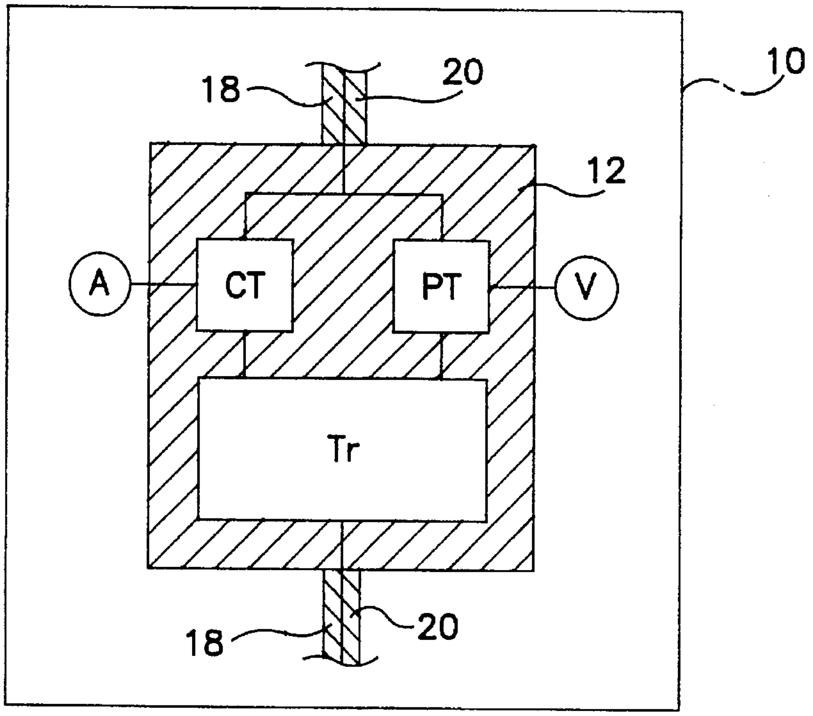
FIG. 1 is an explanatory view showing an electrical energy-transforming equipment according to a first embodiment of the invention.

FIG. 1 shows the whole arrangement of an electrical energy-transforming equipment according to a first embodiment of the invention. In this embodiment, a transformer Tr (a combination of a single-phase transformer, a three-phase transformer, or the like) to be arranged within a cubicle 10 for distributing electric power is molded by a molding material 12. A current transformer CT and a potential transformer PT connected to the primary side of the transformer Tr are molded together with the transformer Tr, with the molding material 12. That is, the transformer Tr, the current transformer CT, and the potential transformer PT are molded in one piece with the molding material 12, thereby preventing high-voltage portions thereof from being exposed. In this connection, an ammeter A connected to the current transformer CT and a voltmeter V connected to the potential transformer PT are arranged outside the molding material 12. As the molding material, a synthetic resin, such as an epoxy resin and a polyester, and a synthetic rubber, such as butyl rubber and ethylene propylene rubber, are suitably used. Further, in molding the transformer Tr, the current transformer CT and the potential transformer PT into one piece, it is possible to selectively construct the molded piece such that magnetic field is permitted or not permitted to be formed out of the molded piece.

Further, cables 18 leading into the cubicle 10 to be connected to the transformer Tr, the current transformer CT, and the potential transformer PT are also molded with a molding material 20. Therefore, no high-voltage portions within the cubicle are exposed, and hence there is no fear that a person working inside the cubicle 10 for cleaning or maintenance of the devices within the cubicle 10 should receive an electric shock. Further, by molding the current transformer CT and the potential transformer PT, it is possible to prolong the service lives thereof, as well as to prevent in advance deterioration thereof or damage thereto which may result from an insect, a rat, or the like having received an electric shock. Further, as the molding material 20, a material may be suitably employed, which is transparent to permit visual inspection of the inside (cable) therethrough, and at the same time flexible.

Figure 7A:
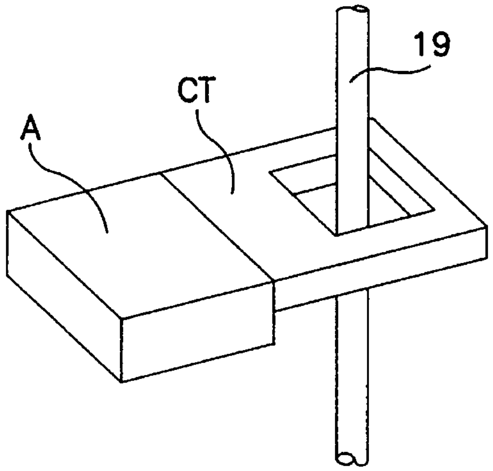
FIG. 7*a* is an explanatory view showing a positional relationship between a current transformer and an electric wire.
Figure 7B:
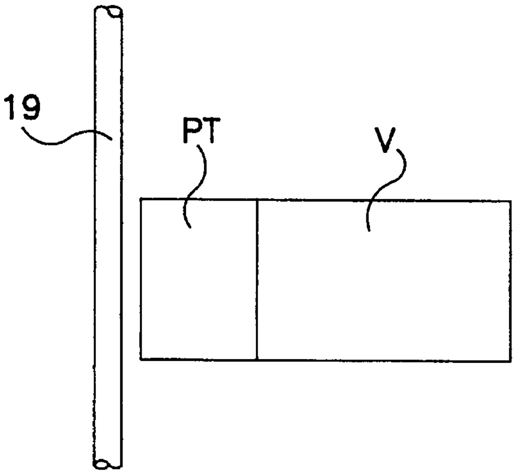
FIG. 7*b* is an explanatory view showing a positional relationship between a potential transformer and an electric wire.

As the ammeter connected to the current transformer CT, there is conventionally used a moving coil type having a needle operated for indication by a large amount of electric current, which is therefore not only dangerous but also costly. Therefore, in the present embodiment, as the ammeter A connected to the current transformer CT, a digital type is used, which is capable of determining a value of electric current by the use of a small amount of electric current. In other words, the current transformer CT and the potential transformer PT, and an electric wire 19 within the molding material 12 can be provided in such an arrangement that they are positioned close to each other with no contacts between them, as shown in FIG. 7*a* and FIG. 7*b*, respectively, thereby making it possible to reduce the amount of electric current flowing through the current transformer CT and the potential transformer PT to very small values. This makes it possible to suppress generation of heat to very small values, and to enhance safety of the electrical energy-transforming equipment as well as to reduce the running cost thereof.

Figure 2:
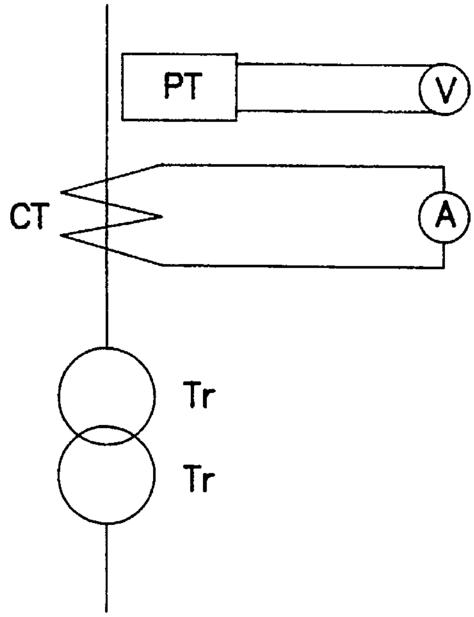
FIG. 2 is a circuit diagram of essential parts of the electrical energy-transforming equipment of the first embodiment, in which is shown an example of a manner of connection between a transformer, and a current transformer and a potential transformer.

FIG. 2 schematically shows an example of a manner of connection of the current transformer CT and the potential transformer PT to the primary side of the transformer Tr. Further, it is recommended to provide holes communicating with the outside of the molded piece formed through portions of the molding material 12 at respective locations corresponding to the current transformer CT and the potential transformer PT, to thereby allow heat generated from these devices to be dissipated therethrough. Further, connecting portions between the transformer Tr, the current transformer CT, the potential transformer PT, and the cables 18 arranged within the cubicle 10 may be positioned at locations (e.g. under the ground) free from fear of contact with a worker, thereby completely eliminating exposed high-voltage portions within the cubicle 10.

Second Embodiment

Figure 3:
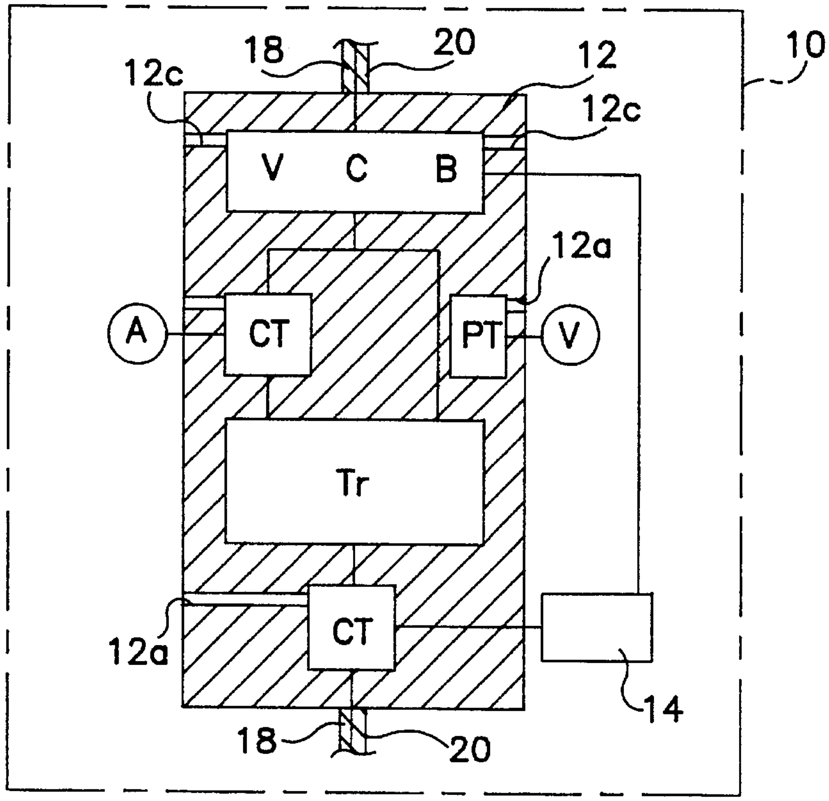
FIG. 3 is an explanatory view showing a electrical energy-transforming equipment according to a second embodiment of the invention.

FIG. 3 schematically shows the whole arrangement of an electrical energy-transforming equipment according to a second embodiment of the invention. A current transformer CT and a potential transformer PT both connected to the primary side of a transformer Tr are connected to a breaker VCB, with these devices being molded in one piece with a molding material 12. Further, the secondary side of the transformer Tr has a current transformer CT connected to the secondary side thereof, which is also molded in one piece with the rest of the electrical energy-transforming equipment with the molding material 12, thereby preventing all high-voltage portions of the equipment from being exposed. In this embodiment, a cable 18 arranged within a cubicle 10 is molded with a molding material 20 comprised of an insulating material which is transparent and flexible.

Connected to the current transformer CT connected to the secondary side of the transformer Tr is an overcurrent-determining circuit (or a demand meter) 14 arranged outside the molding material 12, which is also connected to the breaker VCB. When overcurrent flows through the transformer Tr, the current transformer CT detects this, whereby the overcurrent-determining circuit 14 operates to cause the breaker VCB to instantly open the circuit, to thereby protect the transformer Tr. In addition, the present embodiment is constructed such that holes 12*a* are formed through portions of the molding material at locations respectively corresponding to the current transformer CT and the potential transformer PT, and holes 12*c* through portions at locations corresponding to the breaker VCB, thereby permitting heat dissipation, and smooth movement of moving parts of the devices.

Further, instead of causing the overcurrent-determining circuit 14 to operate the breaker VCB, a suitable alarming lamp may be provided for being lighted for alarm, or a buzzer may be provided for raising an alarming sound, in case of overcurrent. Further, the current transformer CT and the overcurrent-determining circuit 14 for protection of the transformer can be arranged on the primary side of the transformer Tr. In this connect, the use of the overcurrent-determining circuit 14 is advantageous in that the transformer Tr is capable of supplying users with electric power not in terms of a unit kVA of the maximum working power but in terms of a unit kW (=kVA×a power factor) of actually working power.

Further, in this embodiment, the breaker VCB and the transformer Tr are molded in one piece, which prevents a portion connecting the breaker VCB to the transformer Tr from being exposed, thereby preventing an accident of electric shock occurring at this portion of the electrical energy-transforming equipment. Moreover, cables connecting the devices of the equipment are dispensed with, so that it is possible to reduce the manufacturing cost as well as further reduce the size of the whole equipment. In this connection, it is also possible that a breaker VCB separately molded be removably provided for a transformer Tr molded in one piece with a current transformer CT and a potential transformer PT.

Incidentally, a combination connection (V—V connection) of single-phase transformers makes it possible to use a single line for cables connected to the secondary or lower-voltage side of the transformer, and therefore, by connecting a current transformer CT of a built-in type thereto, it is possible to omit a main breaker, thereby reducing the number of component parts of the electrical energy-transforming equipment and hence reducing the manufacturing cost thereof.

Third Embodiment

Figure 4:
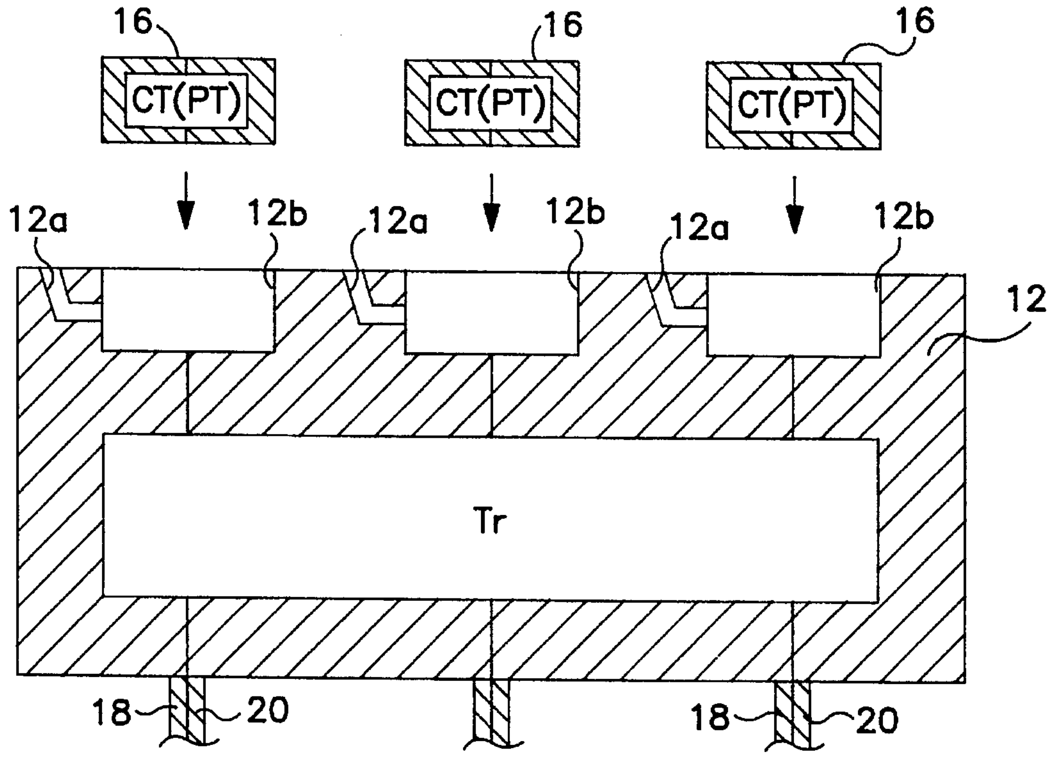
FIG. 4 is an explanatory view showing a electrical energy-transforming equipment according to a third embodiment of the invention.

FIG. 4 schematically shows the whole arrangement of a electrical energy-transforming equipment according to a third embodiment of the invention. In this embodiment, current transformers CT and potential transformer PT formed in respective separate pieces are assembled with a transformer Tr molded with a molding material 12, to form one piece. That is, the current transformers CT and the potential transformers PT per se are molded with a molding material 16 comprised of a synthetic resin, a synthetic rubber, or the like. Further, the molding material 12 for the transformer Tr is formed with a required number of recesses 12*b* at respective required locations such that the molded current transformers CT and the potential transformers PT are fitted in the respective recesses. Each of the current transformers CT and the potential transformers PT is fixed to the molding material 12 by means of a suitable fixing device (not shown). Each recess 12*b* of the molding material 12 has a hole 12*a* formed through the molding material 12 to communicate with the outside of the equipment, thereby permitting heat to be dissipated in a promoted manner. Further, it goes without saying that the whole arrangement is constructed such that when the current transformers CT and the potential transformers PT are fitted in the respective recesses 12*b*, the current transformers CT and the potential transformers are electrically connected to the transformer Tr.

Thus, in this type of the electrical energy-transforming equipment according to the present embodiment in which the current transformers CT and the potential transformers PT can be removably assembled in one piece with the transformer Tr, it is possible to remove a current transformer CT or a potential transformer PT alone for replacement. Further, the electrical energy-transforming equipment of the third embodiment may be constructed such that a breaker VCB, which is separately molded, is also removably arranged in the electrical energy-transforming equipment.

Fourth Embodiment

Figure 5:
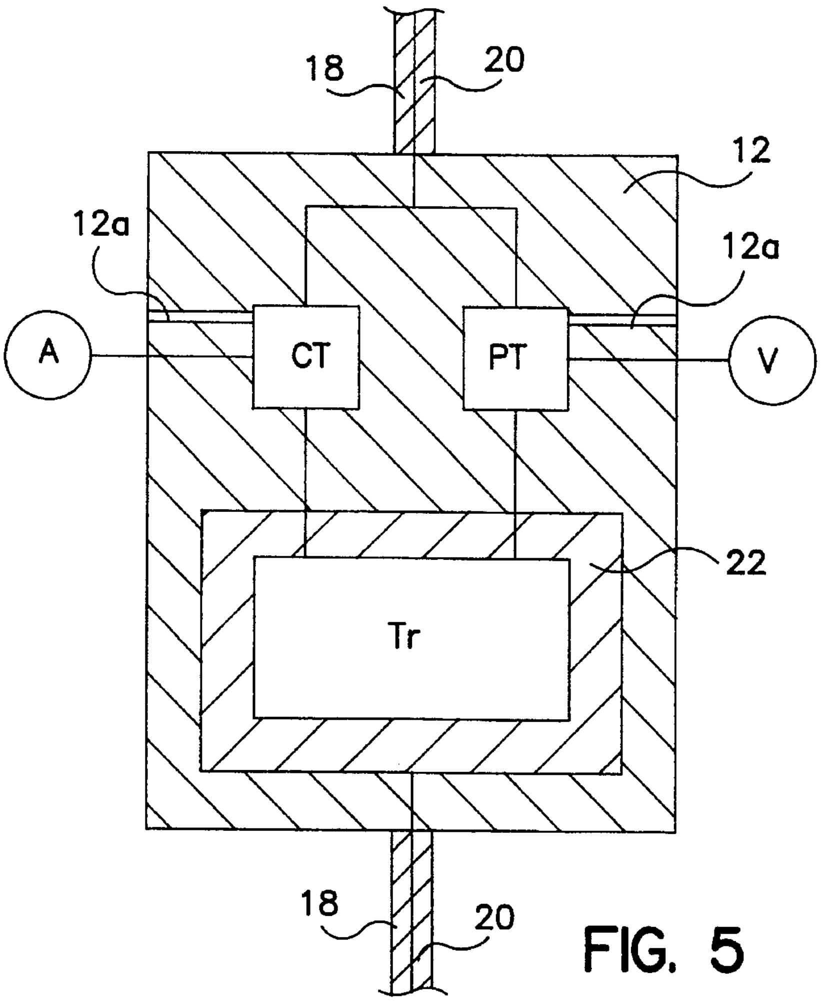
FIG. 5 is an explanatory view showing a electrical energy-transforming equipment according to a fourth embodiment of the invention.

FIG. 5 schematically shows the whole arrangement of an electrical energy-transforming equipment according to a fourth embodiment. In this embodiment, a current transformer CT and a potential transformer PT are connected to a transformer Tr which has been already molded with a molding material 22 comprised of a synthetic resin, a synthetic rubber, or the like. In this state, the three members Tr, CT, and PT are further molded with a molding material 12 to form the electrical energy-transforming equipment. In this embodiment as well, holes 12*a*, 12*a* communicating with the outside of the equipment are provided through portions of the molding material 12 at locations corresponding to the current transformer CT and the potential transformer PT, to thereby permit heat to be dissipated in a promoted manner.

Fifth Embodiment

Figure 6:
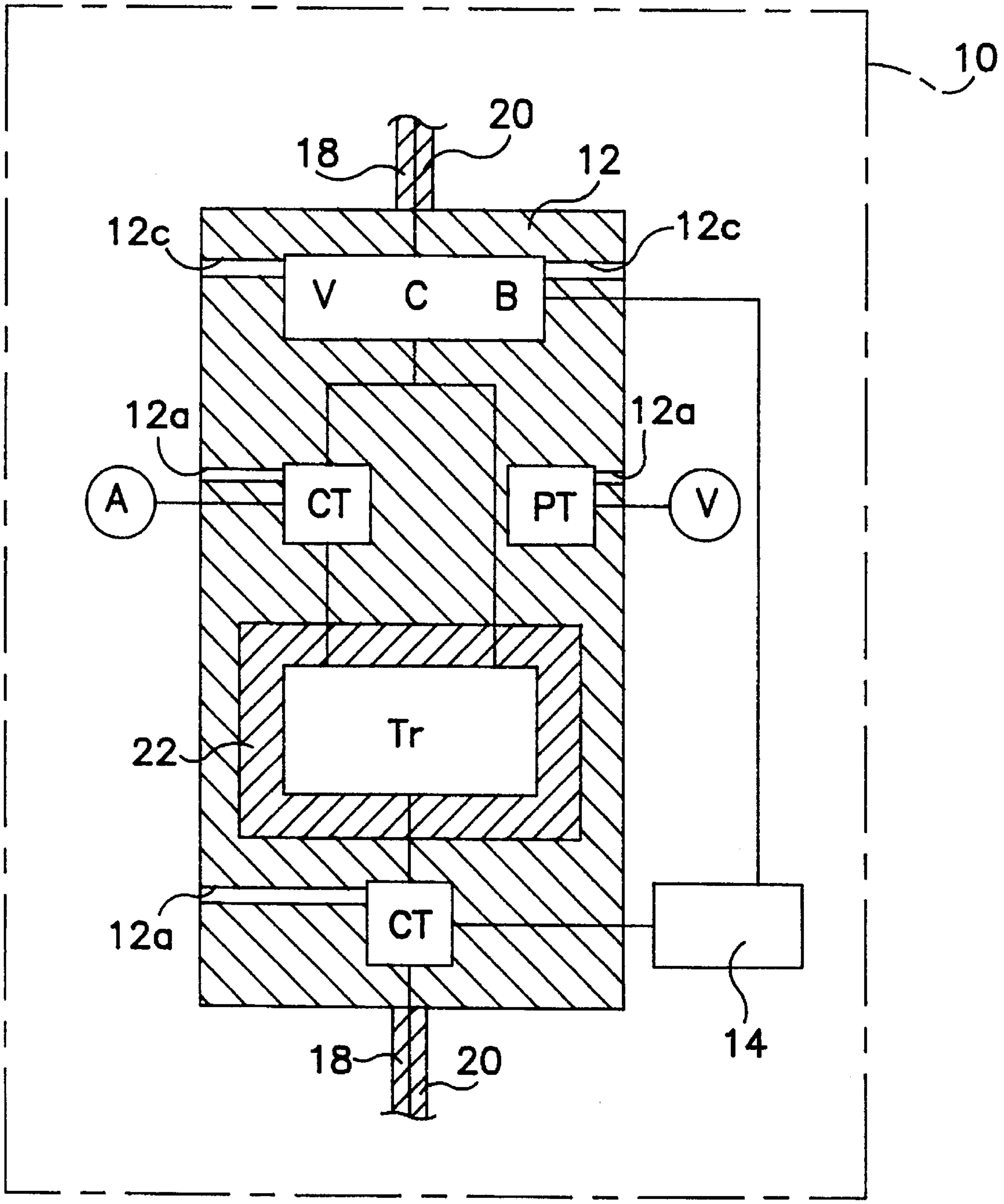
FIG. 6 is an explanatory view showing a electrical energy-transforming equipment according to a fifth embodiment of the invention.

FIG. 6 schematically shows the whole arrangement of an electrical energy-transforming equipment according to a fifth embodiment. In this embodiment, a current transformer CT and a potential transformer PT are connected to a transformer Tr which has been already molded with a molding material 22 comprised of a synthetic resin, a synthetic rubber, or the like, and a breaker VCB are connected to the current transformers CT and the potential transformer PT. In this state, the four members Tr, CT, PT, and VCB are further molded with a molding material 12 to form the electrical energy-transforming equipment. In this embodiment as well, holes 12*a*, 12*a* communicating with the outside of the equipment are provided through portions of the molding material 12 at locations corresponding to the current transformers CT and the potential transformer PT, and a hole 12*c* communicating with the outside of the equipment is provided through portions of the same at locations corresponding to the breaker VCB, to thereby permit heat to be dissipated in a promoted manner.

Further, it goes without saying that when a single-phase transformer and a three-phase transformer are used in combination, the transformer may be suitably used in the embodiments described above, irrespective of whether it may be a horizontal type or a vertical type. When the horizontal type is used, it is possible to further reduce the space within the cubicle for receiving the electrical energy-transforming equipment. Further, in the arrangement of the electrical energy-transforming equipment in which the transformer, the current transformer, and the potential transformer are connected with cables, at such a location as under the ground, it is possible to omit the cubicle.

What is claimed is:

1. A transformer wherein:

an insulating molding material selected from the group consisting of synthetic resin and synthetic rubber is molded entirely around a coil of a transformer for distributing electric power so as to form a solid molded block;

an insulating molding material selected from the group consisting of synthetic resin and synthetic rubber is molded entirely around a coil of each of a current transformer and a potential transformer so as to form solid molded blocks of each of said respective current transformer and potential transformer; and a plurality of recesses formed in a surface of said solid molded block around said coil of said transformer for distributing electric power and said solid molded blocks of said current transformer and said potential transformer are removably fitted into said recesses such that said coil of each of said current transformer and potential transformer is electrically connected to said coil of said transformer for distributing electric power via electromagnetic induction.

* * * * *